United States Patent [19]
Weimer et al.

[11] Patent Number: 5,982,156
[45] Date of Patent: Nov. 9, 1999

[54] FEED-FORWARD CONTROL OF AIRCRAFT BUS DC BOOST CONVERTER

[75] Inventors: Joseph A. Weimer, Springboro; Marian K. Kazimierczuk, Beavercreek, both of Ohio; Antonio Massarini, Bologna, Italy; Robert C. Cravens, II, Bethel, Ohio

[73] Assignee: The United States of America as represented by the Secretary of the Air Force, Washington, D.C.

[21] Appl. No.: 08/843,428

[22] Filed: Apr. 15, 1997

[51] Int. Cl.⁶ ..................................................... G05F 1/613
[52] U.S. Cl. ......................... 323/222; 323/288; 323/299; 307/9.1; 307/18; 307/24
[58] Field of Search ............................... 307/9.1, 11, 12, 307/18, 24; 323/222, 282, 288, 299, 351

[56] References Cited

U.S. PATENT DOCUMENTS

| | | | |
|---|---|---|---|
| 5,027,051 | 6/1991 | Lafferty | 323/299 |
| 5,318,142 | 6/1994 | Bates et al. | 364/424.01 |
| 5,430,364 | 7/1995 | Gibson | 323/222 |
| 5,567,993 | 10/1996 | Jones et al. | 307/43 |
| 5,568,041 | 10/1996 | Hesterman | 323/222 |
| 5,677,617 | 10/1997 | Tokai et al. | 323/222 |
| 5,757,635 | 5/1998 | Seong | 323/222 |
| 5,769,877 | 6/1998 | Barreras | 607/61 |

*Primary Examiner*—Jeffrey Sterrett
*Attorney, Agent, or Firm*—Gerald B. Hollins; Thomas L. Kundert

[57] ABSTRACT

An open loop control arrangement for an electrical energy flow-controlling circuit coupling the varying terminal voltage of an energy storing capacitor to a fixed voltage direct current aircraft energy supply bus in order to supplement bus voltage transients. The open loop control arrangement allows energy flow from the varying terminal voltage of the capacitor to the fixed bus voltage by providing a time varying pulse modulation cycle in an energy conveying and voltage changing inductive element located in the energy coupling path. The open loop control arrangement senses input voltage rather than output voltage of the coupling circuit in what is termed a "feed forward" output regulation algorithm. A transistorized and integrated circuit inclusive preferred embodiment of the invention is disclosed in which a disconnect of the inductance from the aircraft supply bus is accomplished during shunt path inductance energy charging portions of an operating cycle.

21 Claims, 6 Drawing Sheets

5,982,156

FEED-FORWARD CONTROL OF AIRCRAFT BUS DC BOOST CONVERTER

CROSS REFERENCE TO RELATED PATENT DOCUMENTS

The present document is somewhat related to the copending and commonly assigned patent documents "Super Capacitor Charging", AFD 00193, serial number 08/843,406 and "Super Capacitor Battery Clone" AFD 00102, serial number 08/843,408 which are filed of even date herewith. The contents of these related two applications is hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

This invention concerns the field of aircraft electrical energy supply systems and the controlled supply of energy to an aircraft electrical bus from an energy supplementing apparatus controlled by an open loop regulator arrangement which may be used in both the aircraft bus control and other environments.

Batteries are widely used to store electrical energy. However, the use of batteries encounters numerous problems largely relating to the electrochemical nature of an electrical battery, problems which include severe energy density limitations, environmental hazards, safety problems, maintenance costs, charging rate limitations, finite number of possible charge cycles and battery life, memory problems in some batteries such as the popular NiCd device, complicated charging circuits, and need for continuous replacement.

Future aircraft electrical energy supply systems in addition may involve the widespread use of a higher voltage direct current electrical energy distribution bus, a distribution involving energization by the rectified output of a polyphase alternator and voltages above the level of one hundred volts for example. In addition to greater levels of energy availability and reduced weight of conductor metal which is possible in such distribution systems, the use of higher voltage distribution in these future aircraft is seen to offer advantages in the area of lower bus current levels, smaller bus conductors and better electrical transient control or filtering, particularly as to filter weight reduction. These advantages are considered to outweigh the obvious complications of conventional battery exclusion from the bus (e.g., because of the large number of individual battery cells required), absence of bus-accomplished stand alone or static engine start capability, increased hazard to personnel and increased electrical insulation requirements. The F-22 tactical aircraft is perhaps one of the first aircraft with bus energization of this higher voltage direct current type to be considered for widespread use by the United States Air Force.

As an improvement to both these future high voltage aircraft systems, and also to present-day lower voltage direct current bus distribution systems as well, the use of energy storage accomplished in a replacement or a supplement to the commonly encountered electrical battery, e.g., the lead-acid or nickel-cadmium battery, is envisioned. Moreover, the use of such energy storage capability disposed at several distributed locations along the physical extent of an electrical bus or disposed within particular bus load devices (such as avionics or other electronic system housings) is a part of this improved aircraft bus thinking. Such energy storage capability may take the form of one or more storage elements which can float on the bus with little energy demand or current flow during normal operating conditions, employ relatively low current and long duration recharging times and then be capable of rapidly supplying energy to accommodate brief intervals of heavy bus demand or transient loading or bus source interruption. Such arrangements could, for example, enable further reductions in bus metal mass and cross-sectional area and improve voltage regulation along the bus, i.e., could enhance the tradeoff between bus size and bus voltage regulation.

The configuration of such energy storage elements used at distributed locations along a bus for this heavy demand or transient loading improvement is now considered to reasonably include large capacitance capacitors, i.e., capacitors of the multiple farad electrical size or "super capacitor" type. In this configuration, it is notable that the capacitor is employed as an energy storage element rather than for its low alternating current impedance or other characteristics. Indeed a super capacitor may not provide the lowest alternating current impedance available in a capacitor. Such "super capacitors" or "double layer capacitors" are, however, considered preferable to a battery for present energy storage uses for reasons of size, weight, reliability and decreased maintenance requirements, and are now readily available as commercial products. Capacitors of this nature are however most readily fabricated as units of large electrical size having moderate operating voltage capability. As noted below herein sizes such as an integral number of farads of electrical capacitance and a few tens of operating volts capability are now conveniently provided. Capacitors of this electrical rating may of course be combined in appropriate series and parallel combinations for use in the present invention.

By way of additional background it may be interesting to consider that the super capacitor element itself was first investigated by Helmholtz in 1879. According to one super capacitor arrangement, one electrode of the device is made of carbon and the other is made of a liquid electrolyte. When a voltage is applied to the carbon layer with respect to the liquid electrolyte, a thin dielectric layer is established adjacent the carbon layer particles. The effective surface area of the dielectric layer and the carbon particles is extremely large—surface areas on the order of 1000 square meters per gram of carbon material can be achieved because of the porous surface of the carbon and the small carbon particle size. The thickness of the dielectric layer on the other hand can be extremely small—on the order of 1 nanometer. As a result, a very high ratio of surface area to dielectric thickness can be obtained and surprising capacitances per unit of capacitor volume are obtainable; therefore desirable volumetric efficiency is obtained for such a capacitor. As may be surmised from a consideration of such structural details however, questions of permissible operating voltage (i.e., the dielectric strength of the thin dielectric layer), tolerable current flow rates with resulting temperature rise, energy losses, liquid electrolyte inconvenience and physical stability of this type of super capacitor require special consideration in the capacitor's design and fabrication sequences.

The large capacitance of super capacitors nevertheless permits the storage of relatively large amounts of energy. As is well known in the electrical art however, a change in the quantity of electrical energy stored in a super capacitor or any capacitor, unlike most battery types, involves a precisely related change in the capacitor's terminal voltage; the capacitor's stored energy quantity being a square-law function of the capacitor's terminal voltage. Therefore, in an energy storage use of such a capacitor there is a need for a power processing circuit that maintains the output voltage constant while the voltage across the super capacitor decreases due to its discharge. When viewed from a different perspective this decreasing voltage relationship also dictates that the storage of useful quantities of electrical energy in a capacitor of practical electrical and physical size requires the capacitor to operate under conditions of large terminal voltage swing. This characteristic is, however, poorly suited to direct bus shunting use of such capacitors in an aircraft or in other electrical bus supplementing applications since a bus is desirably operated with very limited changes in voltage. Enormously sized capacitors are therefore required to store meaningful quantities of usable energy under the conditions of little capacitor voltage change.

The use of an electronic coupling arrangement, i.e., a device such as a direct current to direct current converter switching circuit is seen as an answer to this storage efficiency and other difficulties such capacitor energy storage can encounter. With such a coupling circuit providing energy transfer between a "supercapacitor" storage element and the aircraft bus, the capacitor voltage can be allowed to swing through a large range and thereby provide relatively efficient (and again voltage square law-determined) energy storage while the aircraft bus voltage is held nearly constant. Such a coupling arrangement also allows a marriage of incompatible capacitor and bus voltage ratings, allows for controlled or limited current recharging of the capacitor from the bus and other advantages. With respect to the marriage of incompatible capacitor and bus voltage ratings in a bus supplement apparatus, it is perhaps helpful to appreciate that presently available super capacitors are capable of several hundred farads of capacitance within a single physical container and with an operating voltage of 3–12 volts. Such capacitors provide a stored energy density of 10–20 joules per gram of capacitor weight.

The present invention and each of the above-identified companion inventions relating to the present invention concern a different portion of an aircraft bus supplementing energy storage arrangement disposed generally according to this description. In the present invention the concept of a coupling circuit providing energy transfer between the changing voltage of a "super capacitor" storage element and the aircraft bus is considered. The present invention in combination with the invention of the above identified "Super Capacitor Charging", AFD00193, serial number 08/843,406 patent document provide for both the needed energy flow into and out of a super capacitor element; the invention of the above identified "Super Capacitor Batteiy Clone" AFD 00102, serial number 08/843,408 patent document provides an alternative bi-directional arrangement for this coupling between the super capacitor and the aircraft bus.

The prior art is known to contain numerous converter arrangements for coupling energy from a capacitor to an electrical load element. It is believed, however, that this prior art does not extend to the particular control algorithm and combination of elements used to supply energy from a specific type of capacitor, the super capacitor, when this super capacitor is embodied in aircraft bus supplementation apparatus.

SUMMARY OF THE INVENTION

The present invention provides for improved regulation performance in an electrical energy control circuit, an energy control arrangement which is free from, e.g., the transient-susceptible effects of a negative feedback regulator arrangement.

It is an object of the present invention therefore, to provide an aircraft direct current to direct current converter arrangement which is useful to couple energy from an energy storing electrical capacitor to an aircraft electrical bus.

It is another object of the invention to provide an unusual electrical regulator circuit which is useful in such an aircraft energy coupling arrangement.

It is another object of the invention to achieve voltage regulation in an aircraft bus direct current converter circuit without the use of negative feedback signals.

It is another object of the invention to achieve voltage regulation in an aircraft bus direct current converter of the inductance-based chopper converter type without the use of negative feedback.

Additional objects and features of the invention will be understood from the following description and claims and the accompanying drawings.

These and other objects of the invention are achieved by the direct current aircraft electrical energy distribution apparatus comprising the combination of:

a source of direct current electrical energy located in said aircraft;

an electrical bus having an array of electrical bus conductors, including an electrically insulated bus conductor, connected with said source of direct current electrical energy, extending throughout said aircraft including distal portions of said aircraft, and connected in energizing relationship with a plurality of aircraft electrical load devices disposed throughout said aircraft;

a plurality of electrical energy storage devices located at selected distributed locations disposed throughout said aircraft and connected locally to said array of electrical bus conductors at each said selected distributed location, said electrical energy storage devices including an super capacitor element and an energy coupling electronic circuit communicating a transient flow of electrical energy from said super capacitor to said electrical bus conductors;

said energy coupling electronic circuit including a power handling portion comprising an. electrical inductance element connected between a first output terminal of said super capacitor element and an internal circuit node, a shunt disposed field-effect switching transistor having drain and source terminals connected between said internal circuit node and a ground-connected second output terminal of said super capacitor element, a series disposed electrical diode element connected between said internal circuit node and a load connected portion of said electrically insulated bus conductor of said aircraft electrical bus;

said energy coupling electronic circuit also including a feed-forward regulator portion comprising an operational amplifier voltage comparator circuit having a voltage-sensing first input terminal connected with said super capacitor first output terminal by a resistive voltage divider network, a second input terminal connected with a source of sawtooth waveformed selectable pulse width switching signals and an output port coupled to a gate terminal of said power handling portion shunt disposed field-effect switching transistor;

said resistive voltage divider network of said feed-forward regulator portion having a voltage divider transfer function of complementing quantitative relationship with a transfer function relating super capacitor voltage and aircraft bus voltage;

a super capacitor re-charge electrical circuit connected between said aircraft bus and said super capacitor element.

DETAILED DESCRIPTION

Figure 1:
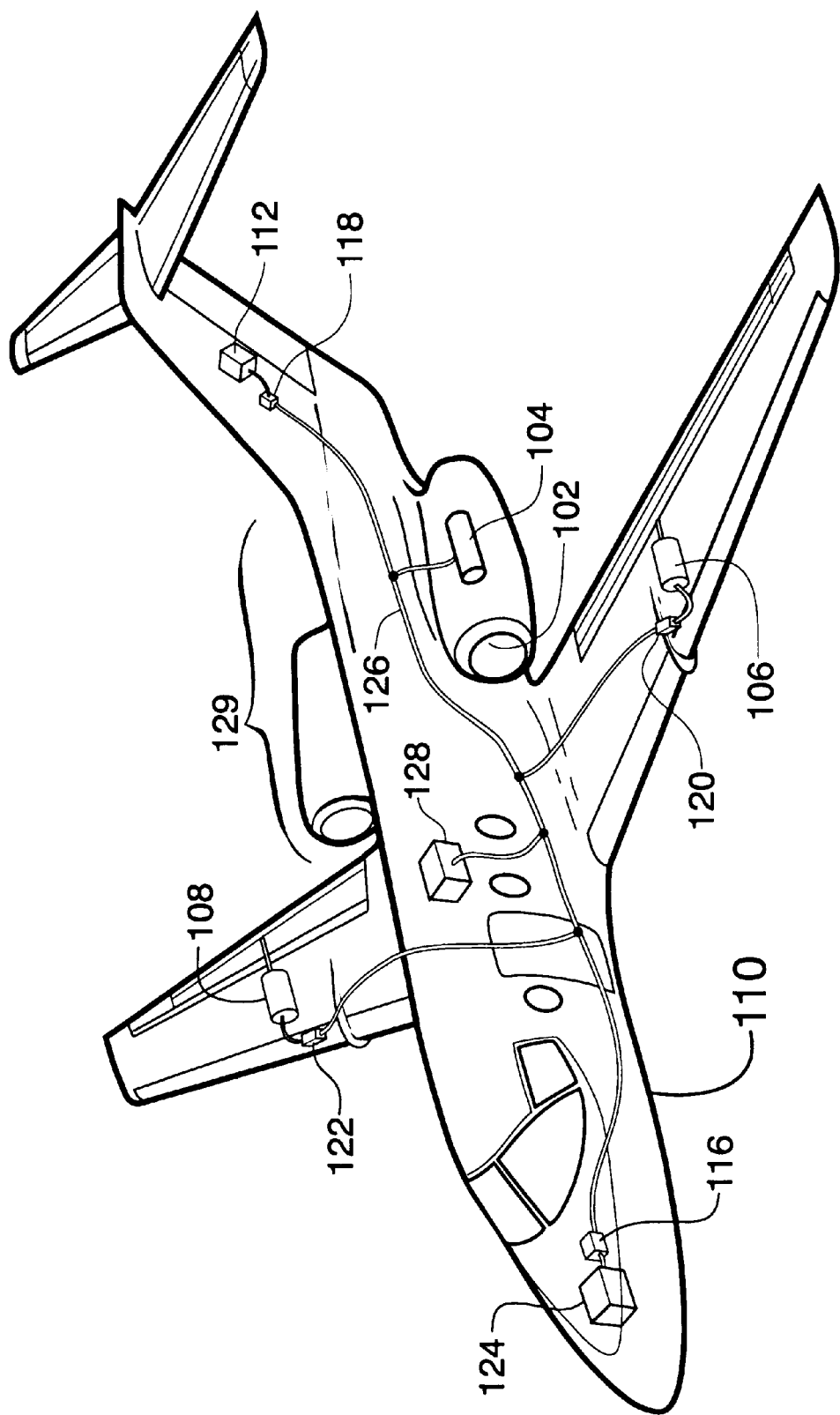
FIG. 1 shows a representative aircraft energy distribution bus with typical bus loads and with bus supplementing apparatus which may incorporate the present invention.

FIG. 1 in the drawings shows an aircraft electrical energy distribution system in which a super capacitor charging apparatus according to the present invention may be used. In the FIG. 1 apparatus an aircraft 110 of the small passenger type or corporate jet type is shown to be provided with a direct current energy supply bus 126 which is capable of conveying electrical energy between a plurality of energy sourcing, storing and using devices that are distributed throughout the aircraft. The bus 126 may represent a plurality of electrically insulated conductors or a single electrically insulated conductor which operates by way of a common ground path inclusive of the framework, skin metal and other parts of the aircraft 110. Some aircraft use buses of the type represented at 126 for distributing alternating current energy, often multiple phased alternating current energy of some few hundred volts electrical potential, while other aircraft, particularly currently active and older aircraft employ lower voltage direct current bus energization. The designers of future aircraft contemplate the use of higher direct current voltages than the present "standard" of some twenty eight volts direct current for buses of the 126 type.

Some of the needs to be served in supplying electrical energy to aircraft loads of the different classifications now found on a military aircraft can be better appreciated in view of the following citation from a technical paper presented by one of the inventors named in the present patent document. In this citation the results of a study regarding a "more electric" modification of an F/A-18 military aircraft are being discussed. These "more electric" modifications include replacement of many present day hydraulic and air driven mechanical energy sources in the aircraft with electronically controlled electrical motor energy sources, the extensive use of regenerative energy coupling from a mechanical energy-storing load back to the aircraft bus, reduced dependence on 400 Hertz electrical power and its attending hydraulic transmission apparatus, incorporation of 270 volt direct current power and other concepts novel to present day aircraft.

This citation in slightly edited form reads as follows: The load study for the F/A-18 More Electric Aircraft produced 165 kilowatts of loading for continuous operation and 217 kilowatts loading for a 5 second peak operation. The 165 kilowatts of continuous loading can be divided into 125 kilowatts of motor loads and 40 kilowatts of avionic and other electronic loads. Thirty eight (38) kilowatts are flight critical loads in which 33 kilowatts can be interrupted for no more than 50 milliseconds and 5 kilowatts can be interrupted for no more than 50 microseconds. The large amount of flight critical loads clearly illustrates the need for a highly reliable fault tolerant electrical power system. Also the high percentage of motor loads will challenge the power system to deliver high quality power to non-motor loads. Additionally, the majority of the More Electric Aircraft loads and avionic loads require 270-volt DC power.

This citation is from page 275 of the paper titled "Power Management and Distribution for the More Electric Aircraft" authored by Joseph A. Weimer, a paper presented at the presented at the Intersociety Energy Conservation Engineering Conference (OECEC) as paper No. AP-385, ASME 1995, American Society of Mechanical Engineers. As may be somewhat appreciated from this citation, there is a recognized need for better quality power at moderate power levels in a modern military aircraft, power which is of such interruption and transient free nature as to avoid even 50 microsecond interruptions and be capable of supporting the continuous operation of flight control, weapons system, navigation and other computer apparatus. An example of how far some present day military aircraft fall short of this level of power quality is to be found in the example of certain present day aircraft in which computer interruption frequently occurs with changeover from ground power to engine power. A need to operate heavy and inductance-inclusive loads such as multiple horsepower motors in aircraft having electrical replacements for present day hydraulic systems will clearly not ease this problem. The present series of three inventions is directed to several aspects of supplying improved quality power for such aircraft.

Connected to the energy supply bus 126 in FIG. 1 are therefore a plurality of devices which cause the flow of electrical current in the bus conductors. These devices include an electrical generator or alternator and associated rectifier array which are represented at 104 in FIG. 1 and an electrical battery represented at 128 in FIG. 1; these devices act as sources of the electrical energy distributed by the energy supply bus 126. The battery 128 in FIG. 1, which is contemplated to be a conventional electrochemical battery, of course serves as a temporary repository for electrical energy which originates in the generator/alternator 104 or from ground based energy sources during some phases of aircraft operation. Electrical energy consuming devices represented in the FIG. 1 drawing include the aircraft wing flap positioning motors 106 and 108 and the electronic circuit devices 112 and 124 which are often mounted in remote locations of the aircraft 110—in such regions as the illustrated nose and tail recesses. The illustrated loads are intended to represent other motor and inductive element-inclusive loads and a variety of electronic loads which appear in current day aircraft. The electronic circuit device loads 112 and 124 may be considered as typically representing a radar system and an avionics computer system for examples. It is perhaps notable that some such electronic loads imposed on aircraft bus systems, loads such as a radar transmitter or a high energy level laser, for example, may generate significant bus voltage transients of electronic origin in addition to the electromechanical sources of transient loading already identified.

The physical length of the energy supply bus 126 segments represented in FIG. 1, particularly the longer length portions of this energy supply bus as indicated at 129, inevitably introduces electrical resistance and electrical inductance components of electrical impedance into the aircraft's bus structure. These components of course add to the impedance components already present in the generator/alternator 104 and the battery 128 to provide an effective impedance for the bus that is usually of some low but certainly not zero value. This effective impedance is of course greatest at remote locations of the bus such as in the locations occupied by the electronic circuit device 112 and the electronic circuit device 124. This impedance although lower in central portions of the aircraft is nevertheless usually of sufficient magnitude even there to provide transient and steady-state voltage drops on the bus in response to the heavy current demands of loads such as the motors 106 and 108 or in response to what is usually the greatest load imposed on an aircraft bus, current flow to the propulsion engine starter. aircraft electrical bus systems are in fact usually designed in response to $I^2R$ or temperature considerations rather than in response to voltage drop characteristics.

It is of course the overall intent of the present and the other two above identified patent documents in the present series to minimize the effects of these nonzero bus impedances, i.e., to limit the transient and to some degree the steady-state voltage changes experienced at various points along the energy supply bus 126. Although these voltage changes are not usually significant with respect to operation of electromechanical devices such as the motors 106 and 108, such brief and temporary voltage changes can be quite a different matter to the typical electronic systems represented by the electronic circuit devices 112 and 124. In such system energy supply transients can interrupt normal circuit function, become coupled into low level signal circuits, alter the learning of self adapting circuits, change latched or unlatched conditions and even result in component part failures. Practicality and such factors as weight and cost considerations however limit the degree to which such electronic systems can be separately energized from the electromechanical loads in the environment of an aircraft. Through the addition of energy storing elements located close to heavy electromechanical loads and close to sensitive loads such as the electronic circuit device 112 and electronic circuit device 124 many of the harmful voltage transients encountered on an aircraft bus can be either eliminated or reduced in magnitude or slowed in onset (i.e., high frequency energy content attenuated) to the point of reducing their effect on sensitive loads such as the electronic circuit device 112 and 124. These elimination, reducing and slowing effects may for example significantly reduce the electromagnetic coupling of such transients to sensitive internal components of the electronic circuit device 112 and 124 systems or alternately bring the correction of such transients within the capability of power supply regulators usually incorporated in devices such as the electronic circuit devices 112 and 124. In order to provide this transient attenuation capability it is of course recognized that significant quantities of electrical energy must be transferred and transferred over relatively short time intervals.

In the present series of patent documents this correction of transients on the energy supply bus 126 is based on the energy storage capability of capacitors which have become known as super capacitors, based not on the low electrical impedance such capacitors may offer at their terminals as on the energy storage ability such capacitors can provide when operated over relatively large swings of terminal voltage. (Use of the former low impedance characteristic results in volumetric and weight efficiencies which are deemed too low for aircraft use since much of the super capacitors voltage capability is wasted in storing energy that is never accessed by the aircraft bus, i.e., in Coulombs of energy vested in capacitor voltage lower than that which can be tolerated on the energy supply bus 126.) In the present of these patent documents one aspect of or one arrangement for communicating electrical energy from the super capacitor storage element back to the aircraft bus 126 is addressed. In the FIG. 1 drawing the super capacitor inclusive energy storing elements and the presently described super capacitor to bus coupling arrangement are physically disposed in the locations indicated at 116, 118, 120 and 122.

A DC-to-DC pulse-width-modulated (PWM) switching-mode power converter, i.e., the converter preferably used in the locations 116, 118, 120 and 122 in FIG. 1, processes power by a sequence of energy transfer cycles. In each of these cycles a quantum of energy is taken from an input source and transferred to a load via an electrical circuit containing a magnetic energy storage device (an inductor) and usually also containing capacitors. These converters, in order to be used effectively, need some control arrangement which can provide regulation against changes in the input voltage and/or the load current experienced by the converter.

Voltage regulation of a direct current to direct current pulse width modulated switching-mode power converter is commonly accomplished through a closed-loop negative feedback control arrangement. Under such control the output voltage of the converter circuit is sensed and compared with a fixed reference voltage. If the output voltage of the converter circuit undergoes changes caused by either input voltage or load current variations, an error signal is generated in the feedback circuit; the amplitude of this error signal is related to the amplitude of the output voltage change. The pulse width modulation parameters are then successively changed until an amount which precisely compensates for and eliminates the error signal is found. This change also of course accomplishes the needed change in the converter output.

In a pulse width modulated system such as this, the time intervals associated with the turning ON and OFF of a switching power device therefore provide an "area under the curve"-accomplished control of the converter output. In this control or regulation the inductive element is used to store energy of the successive pulse-transferred quantums of energy and thereby achieve conversion of these quantums of energy into smooth and undulation-free direct current. The inductive energy storage element also enables the voltage boost or voltage decrease capability of the converter through an application of the concept of inductor voltage being determined by the product of inductance magnitude and rate of change of current (the V=L di/dt concept. In order to obtain the pulse width modulated signal used within the converter, the error signal and a pulsating waveform such as a sawtooth waveform may be mixed or "ANDED" in some fashion such as supplying each signal to opposite terminals of a comparator circuit. Such a comparator circuit in turn, produces a pulse width modulated output signal used for driving the inductor-connected switching power device.

A negative feedback control loop used in this fashion proves to be well suited for load change regulation in a converter energy sourcing apparatus, but it fails in providing good regulation against variations over a wide range in the converter input voltage. Furthermore, such a negative feedback control loop cannot provide good dynamic regulation when the converter input changes are relatively fast. The response of the feedback control loop is inherently slow because of lags in the transfer functions both of the power stage and the control circuit. The present feed-forward control arrangement is moreover inherently stable and provides a fast dymanic response.

In order to alleviate the difficulties of negative feedback control, the feed-forward control concept described herein may be used. In such a feed-forward control scheme, the converter input voltage, for example the terminal voltage of an energy storing super capacitor, is sensed and upon discovering change, the duty ratio of the pulse width modulated switch is altered to compensate for that change. Feed-forward regulation is effective for large variations of the sensed variables and compensation is provided with almost no delay. A small lag is due to the sampling process may be the most significant delay encountered. If the feed-forward open-loop correction is not perfect, a closed-loop negative feedback control circuit of limited response capability can be added to provide regulation for small residual changes.

Feed-forward regulation arrangements have been applied to the voltage bucking configuration of a direct current to direct current converter by others working in this art. The textbook "Switching Regulator Analysis," by D. M. Mitchell, McGraw-Hill: New York, 1988, for example describes at pages 38–39 a feed-forward direct current to direct current converter of the voltage bucking or voltage decreasing type which uses sawtooth waveform amplitude modulation to accomplish feed-forward control. As is recited at the end of the second last paragraph on page 39 of this text material however the disclosed converter arrangement is limited to the voltage buck converters and has been implemented using sawtooth generators which are not able to provide the constant sawtooth waveform magnitudes relied upon in the present invention. In the herein-described feed-forward control concept, the converter input voltage is therefore compared to a sawtooth waveform of a constant amplitude. Thus this waveform serves two purposes in the invention, as a modulation source and as an amplitude reference. The peak amplitude of the sawtooth waveform generator may be used conveniently for this reference purpose and should be equal to or greater than the maximum value of the $V_{REF}$ signal at 404 in FIG. 4 to accomplish such an arrangement.

Use of a sawtooth waveform of constant amplitude is significant from another viewpoint in addition to this reference signal consideration in the present invention. This is because a sawtooth waveform of nonconstant but converter input voltage-determined amplitude—as is called for in the Mitchell text, results in poor converter output regulation when the converter is operating in the voltage boost mode. Since the present invention converter is intended to operate in this boost mode, i.e., to add to the previously available pulse width modulated converters and provide a voltage boost converter of the pulse width modulated type, it is desirable to use the sawtooth of constant amplitude for this additional stability reason in the present invention. The indication of operational amplifiers 204, 402 and 400 being energized from sources of "V" potential in FIGS. 2 and 4 of the drawings, in lieu of from either of the other available voltages of "$V_I$" or "$V_o$" for example, is used to convey this separate source of energization concept in the present document. Such operational amplifier separate and constant voltage energy sourcing of course requires energization from a non-internal source, e.g., from a separate Zener diode regulated source.

An additional aspect of the present invention converter is its use of a modulation switch ON time which makes the complement of the duty cycle [i.e., (1-D)] proportional to the converter input voltage or current rather than the duty cycle being inversely proportional to the converter input voltage or current as is the situation in the converter described in the Mitchell text. This inverse relationship is another arrangement allowing the present invention converter to operate in the voltage boost mode rather than the voltage buck mode as described for the Mitchell converter and also produces good regulation performance over a large range of converter input voltage. Additional details regarding this inverse proportional relationship are disclosed in connection with the several equations recited below.

The present invention therefore provides a feed-forward control circuit for direct current to direct current pulse width modulated switching-mode boost converters. The described circuit can provide optimal regulation against changes of converter input voltage. This means that a conventional closed-loop negative feedback control circuit is not necessary in the converter, however, such negative feedback can be used in supplementation if needed. Since the output voltage of a boost circuit is not overly sensitive to load variations for the continuous conduction mode (CCM), whereas it has a nearly linear dependence from the input voltage, the application of feed-forward control is much more effective for line regulation applications. It can however also be applied to a load regulation situation.

Figure 2:
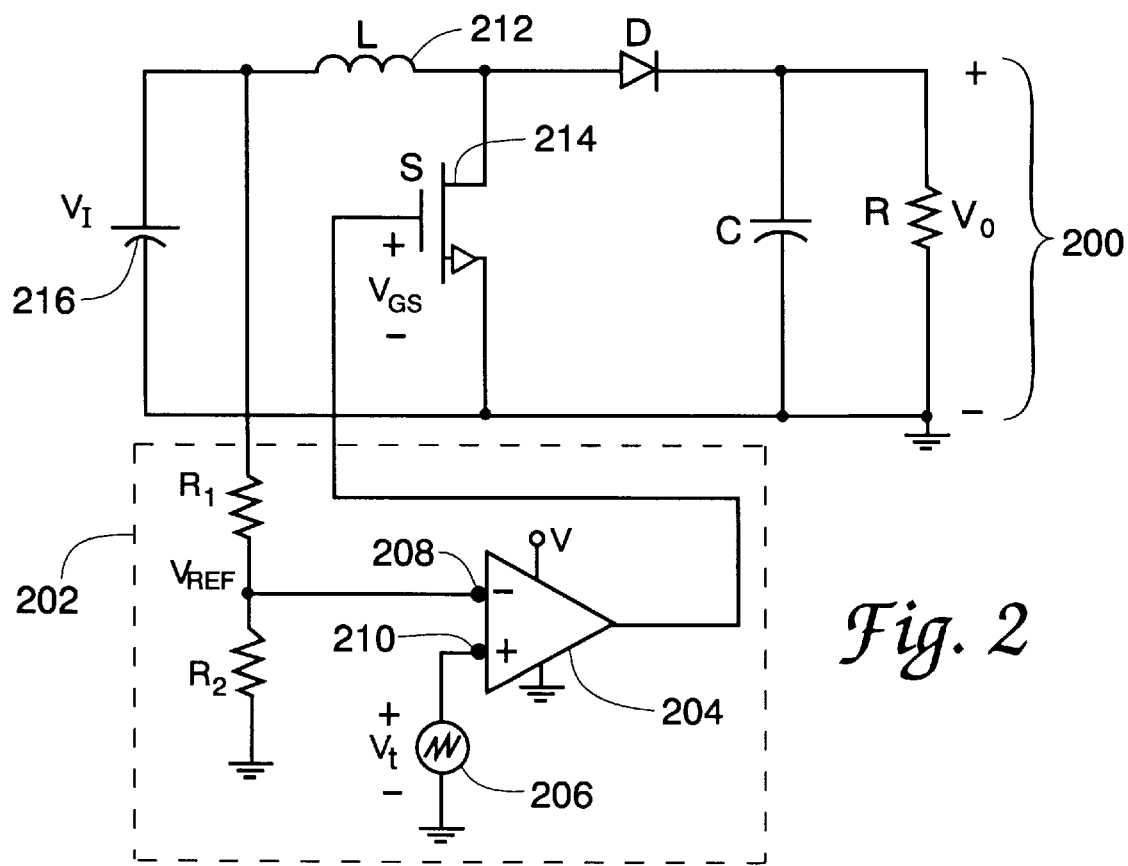
FIG. 2 shows a direct current to direct current boost pulse width modulated converter circuit which is controlled according to the present invention.

A preferred arrangement for a feed-forward control circuit for a boost DC-to-DC converter used in the FIG. 1 aircraft bus supplementing arrangement is shown in FIG. 2. of the drawings. In this FIG. 2 drawing the upper portion of the circuit at 200 represents the direct current to direct current converter or power portion of the circuit with its inductive element 212, the super capacitor 216 and the switching transistor 214 being specifically identified while the lower circuit portion at 202 represents a preferred arrangement of the feed-forward control circuit of the present invention. The feed-forward circuit portion of the FIG. 2 converter consists of a comparator 204 and a voltage divider composed of resistors R l and R2. The comparator 204 may be embodied in the form of an operational amplifier, which is energized by the single voltage source, V (an operational amplifier which can process input signals inclusive of zero volts potential is needed, an operational amplifier of the dual voltage-energized type, i.e., employing positive and negative energization supplies may therefore be advantageous in some invention embodiments).

A sawtooth switching voltage $V_t$ from a source 206 such as a transistor circuit of the constant current charging of a capacitor-type, (as is known in the electronic art) is applied to the non-inverting input 210 of the operational amplifier comparator 204. The peak value of this sawtooth signal is fixed, usually at a magnitude of 5 to 10 volts. The frequency, f, of the sawtooth voltage determines the switching frequency of the converter, and is preferably fixed at a frequency near 100 kilohertz but may also be of a varying frequency nature. It is notable that this frequency of the sawtooth waveform is a significant factor in determining the upper frequency corner of the FIG. 2 converter and therefore influences the greatest bus frequency transient component which the converter can accommodate. The $V_{REF}$ signal to be mixed with the sawtooth signal is derived from the converter DC input voltage $V_I$, via the voltage divider network comprised of the resistors $R_1$ and $R_2$. This signal is applied to the inverting input terminal 208 of the operational amplifier 204 as shown in FIG. 2. The output of the operational amplifier 204 as a result of these two input signals is a pulsed waveform as shown in FIG. 3b of the drawings.

It should be noted that the voltage divider network comprised of the resistors $R_1$ and $R_2$ may be considered to provide a transfer function between the input voltage of the FIG. 2 converter, i.e., the super capacitor voltage, and the voltage level VREF that is coupled to the comparator 204 of the feed-forward regulator 202. Moreover upon reflection it is also apparent that the power transferring or higher current portions of this FIG. 2 converter may be considered to also act in accordance with a second mathematical transfer function, a transfer function relating the converter input voltage from the super capacitor to the aircraft bus load represented by the resistor R in FIG. 2, a load operating at the fixed level of the aircraft bus voltage, the bus represented by the load resistor R in FIG. 2. Upon further reflection it may also be apparent that these two transfer functions should be related in some fashion if the converter's output is to equal the fixed bus voltage as a result of being controlled by the changing input voltage, for example, from the super capacitor. For purposes of the present invention this relationship between the identified transfer functions may be referred-to as a complementary relationship.

Although operation of the FIG. 2 feed-forward regulator may be understood from an empirical consideration of the FIG. 2 circuit and the signals applied to this circuit, a mathematical description of this operation may also be helpful, especially with respect to an appreciation of the regulation achieved by the circuit. In the FIG. 2 circuit, the reference voltage $V_{REF}$ is related to the input voltage $V_I$, i.e., to the bus voltage of the FIG. 1 aircraft 110 by the Ohm's law based equation:

$$V_{REF} = (R_2 V_1)/(R_1+R_2) = \alpha V_I \quad (1)$$

where $\alpha = R2/(R1+R2)$. The output voltage of the comparator is a rectangular wave as shown in FIG. 3b of the drawings and is used as a gate-to-source voltage $V_{GS}$ to drive the switching transistor device 214 (for instance a power MOSFET). If the output current of the comparator is not high enough to drive the switching transistor 214 at high frequencies, a non-inverting buffer may be inserted between the comparator and the switching transistor.

The on-duty cycle of the switch is defined as $$D = t_{on}/T \quad (2)$$

where $t_{on}$ is the time interval during which the switch is ON and $T = 1/f$ is the period of the switching frequency f. The duty cycle D depends on the reference voltage $V_{REF}$, which in turn depends on the converter DC input voltage $V_I$.

Figure 3:
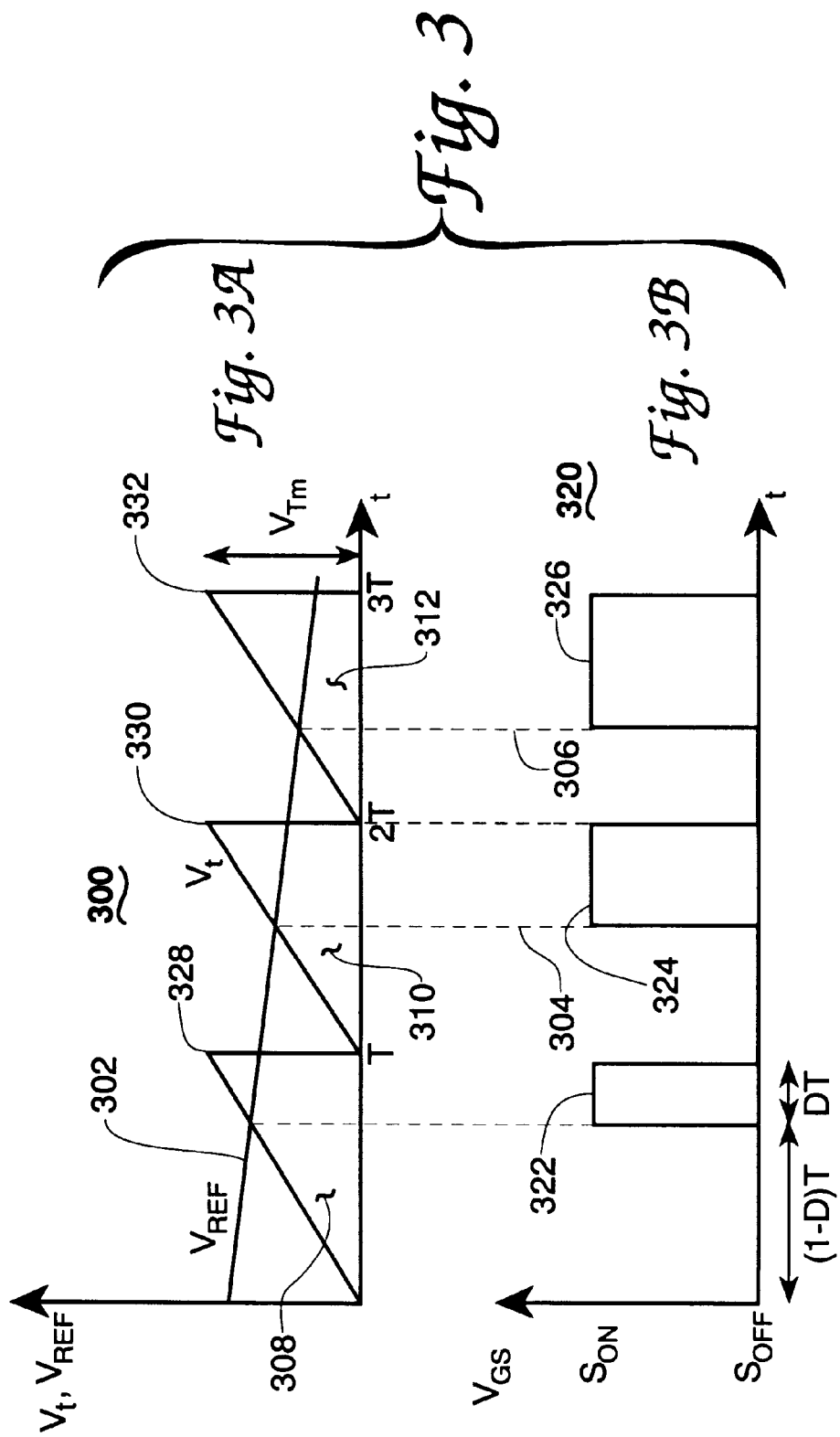
FIG. 3 shows a series of electrical waveforms relating to operation of the FIG. 2 circuit.

The operating principle of the FIG. 2 feed-forward control circuit may be further appreciated from the waveforms of $V_t$, $V_{REF}$, and $V_{GS}$ shown at 300 and 320 in FIG. 3 of the drawings. At 300 in the FIG. 3 drawing where the $V_{REF}$ and $V_t$ signals are represented, the $V_{REF}$ signal is shown to have a negative slope or to represent a slow decrease in the FIG. 2 converter's input. The actual slow rate of this decrease is better represented in FIG. 5 of the drawings than in the FIG. 3 drawing—as is described below. When the reference voltage $V_{REF}$ at the inverting input 208 of the comparator 204 is instantaneously higher than the sawtooth voltage $V_t$ at the comparator non-inverting input 210, the comparator output signal and the gate-to-source voltage $V_{GS}$ of the transistor 214 goes low, turning the transistor 214 OFF. When the reference voltage $V_{REF}$ is lower than the sawtooth voltage, the voltage VGs goes high, turning the transistor 214 ON. Therefore, the ON-duty cycle of the transistor increases as the converter DC input voltage decreases. This relationship is shown in the portion 300 of the FIG. 3 drawing where the upper levels of the illustrated pulses 308, 310 and 312, i.e., the pulse portions at 328, 330 and 332 represent transistor 214 ON conditions. These transistor ON conditions are represented by the pulses 322, 324 and 326 in the portion of the FIG. 3 drawing at 320. The timing relationship between the pulse portion 320 and the transistor ON pulse 324, i.e., the pulse width modulated nature of the illustrated waveforms, is indicated by the dotted lines 304 and 306 in the FIG. 3 drawing.

Returning to the discussion of mathematical equations, referring to FIG. 3 and using equation (1), one obtains $$\frac{V_{Tm}}{T} = \frac{V_{REF}[(1-D)T]}{(1-D)T} = \frac{V_I[(1-D)T]}{(1-D)T} \frac{R_2}{R_1+R_2} \quad (3)$$

where $V_{REF}[(1-D)T]$ and $V_I[(1-D)T]$ are the values of the reference voltage and the converter input voltage at time $t=(1-D)T$, respectively. Rearrangement of equation (3) provides the equation $$1 - D = \frac{V_{REF}[(1-D)T]}{V_{Tm}} = \frac{\alpha V_I[(1-D)T]}{V_{Tm}} \quad (4)$$

It follows from FIG. 3 and equation (4) that the complement of the duty cycle (1-D) is proportional to the converter input voltage $V_I$. This fact can be used to regulate the converter output voltage against variations in the input voltage $V_I$. As a first order approximation, the output voltage of the boost PWM converter operated in the continuous conduction mode (CCM) without any control circuit is almost independent of the load current and is directly proportional to the input voltage $V_I$. The relationship between the two voltages is:

$$V_O = V_1/(1-D) \quad (5)$$

The inverse relationship between converter output voltage and the complement of converter duty cycle expressed in this equation is notable as a characteristic of the present invention boost converter. This inverse complement relationship is for example in sharp contrast with the relationship disclosed in the above identified Mitchell textbook converter where a voltage bucking converter and a direct relationship between duty cycle D, and output voltage is used. The nature of the mathematical relationship between converter output voltage and duty cycle in the Mitchell text converter is disclosed for compareson purposes in equation (8) which is shown below herein. The distinction between converter operation according to equations (5) and (8) may moreover be appreciated as one of the distinctive features of the present invention.

Substitution of equation (4) into equation (5) yields the output voltage as defined in the equation $$V_O = V_{Tm}/\alpha = (R_2/R_1+1)V_{Tm} \quad (6)$$

Thus, the converter output voltage $V_o$ is independent of the converter input voltage $V_I$, thereby improving line regulation and reducing output low frequency ripple voltage.

In embodying the FIG. 2 circuit the operational amplifier used as comparator at 204 should have a sufficient slew rate capability at a given switching frequency to achieve short rise and fall times in the gate-to-source voltage waveform. Assuming that the rise and fall times of the gate-to-source voltage are $\Delta t = T/20$, the minimum slew rate capability of the needed operational amplifier is $$SR = \Delta V_{GS}/\Delta_1 = 20f\Delta V_{GS} \quad (7)$$

As is illuded to above herein the converter shown at page 38 of the Mitchell textbook can be shown to operate in its regulation action in accordance with the equation:

$$V_o = DV_1 = \text{constant} \qquad (8)$$

a relationship wherein the product of duty clyce and input voltage remains constant or wherein input voltage and duty cycle are inversely proportional. This is of course in contrast with the arrangement expressed in equation (5) wherein the relationship between input voltage and the complement of duty cycle is direct.

It is significant to note in this discussion of the FIG. 2 circuit that the sawtooth waveform from the FIG. 2 source 206 has the peaks of fixed and unchanging amplitude, peak which have been selected to be of an amplitude between 5 and 10 volts as described above and as are represented by the similar-appearing peaks 328, 330 and 332 in FIG. 3. As a result of these fixed amplitude peaks the sawtooth signal generated in the comparator 204 not only provides the pulse width modulation shown in FIG. 3 but also serves as an amplitude reference signal by which the output of the FIG. 2 circuit can be maintained at a constant value, i.e., at the voltage of the aircraft bus in the disclosed embodiment of the invention. The mechanism for this maintenance of a fixed output level can be appreciated by realizing that the width or duration of the pulses shown at 328, 330 and 332 in FIG. 3 will decrease to zero, i.e., the transistor 214 will remain in the OFF condition, in response to a VREF value that is greater than the reference peaks 328, 330 and 332 in FIG. 3. The smaller pulse width or duration of the initial pulse at 322 and the larger pulse width at 326 (in response to a lower value of $V_{REF}$) evidence a trend toward this complete shut-down of the transistor 214 chopper at a $V_{REF}$ value exceeding the reference peaks at 328, 330 and 332.

Figure 4:
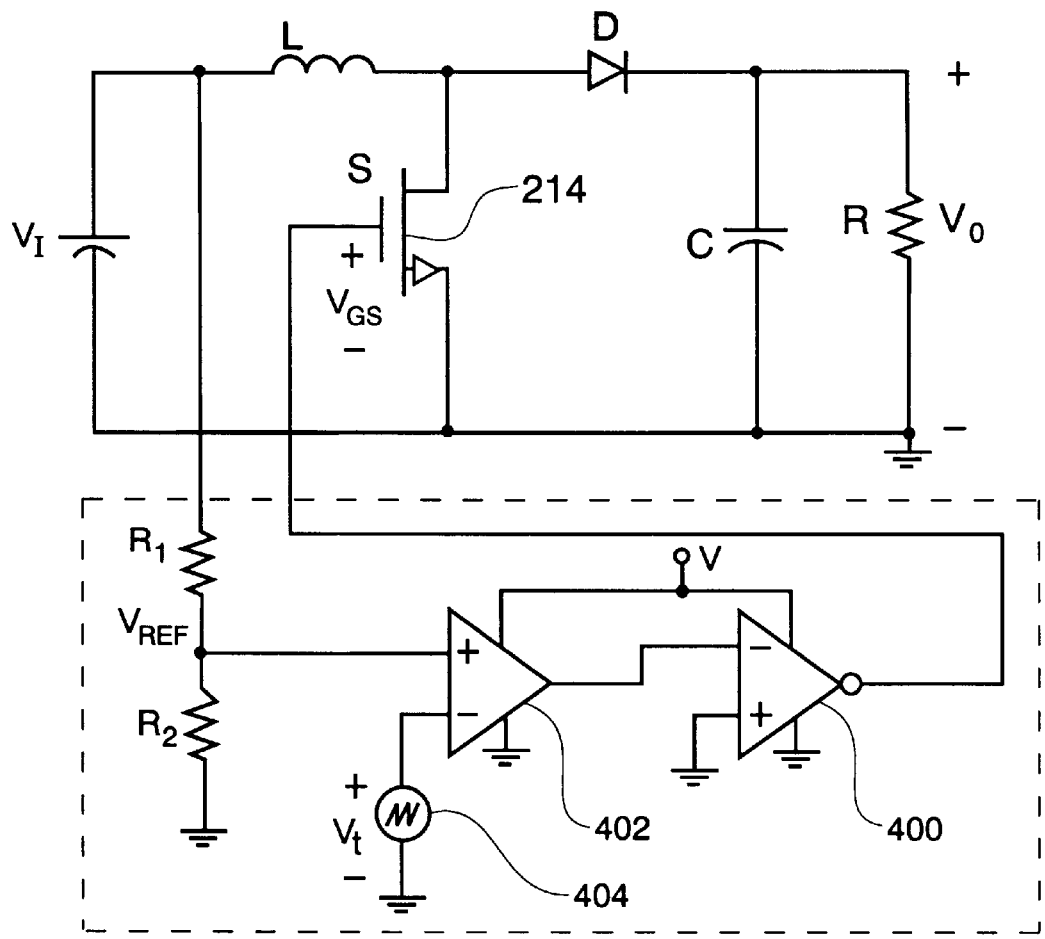
FIG. 4 shows a direct current to direct current boost pulse width modulated converter circuit which is controlled according to a modification of the present invention.

FIG. 4 in the drawings shows a modified feed-forward control circuit having the above mentioned buffer amplifier 400 inserted between the operational amplifier 402 and the transistor 214. In the FIG. 4 arrangement of the invention it is presumed that the buffer amplifier 400 is a signal inverting operational amplifier and the signals applied to the comparator operational amplifier 402 are therefore reversed from the connections shown in FIG. 2—in order that signals applied to the transistor 214 remain of the same polarity as in the FIG. 2 circuit. (for example the sawtooth voltage $V_t$ is applied to the inverting input of the comparator and the reference voltage $V_{REF}$ is applied to the non-inverting input in the FIG. 4 circuit.)

Figure 5:
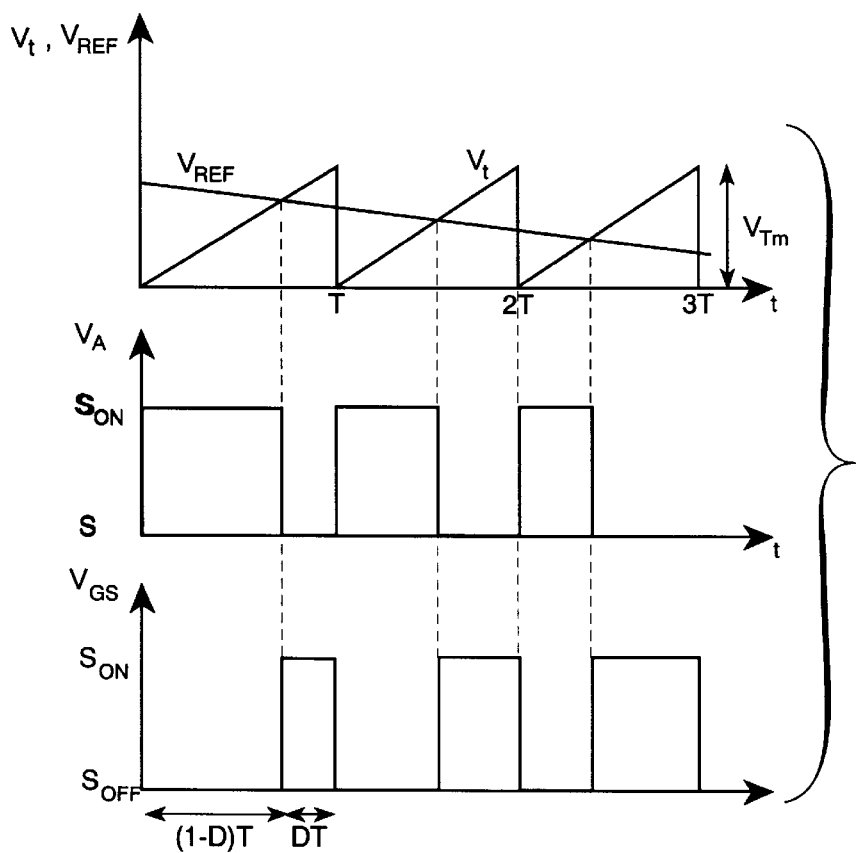
FIG. 5 shows a series of electrical waveforms relating to operation of the FIG. 4 circuit.

Waveforms relating to operation of the FIG. 4 circuit appear in FIG. 5 of the drawings and are similar to those of the FIG. 2 circuit as appear in FIG. 3. A comparison of the FIG. 3 and 5 drawings reveals in fact that the waveforms of voltage $V_t$, $V_{REF}$, and VGS are the same for both feed-forward control circuits. Therefore, equation (6) again holds true for the FIG. 4 circuit and consequently the converter output voltage is again independent of the converter input.

Figure 6:
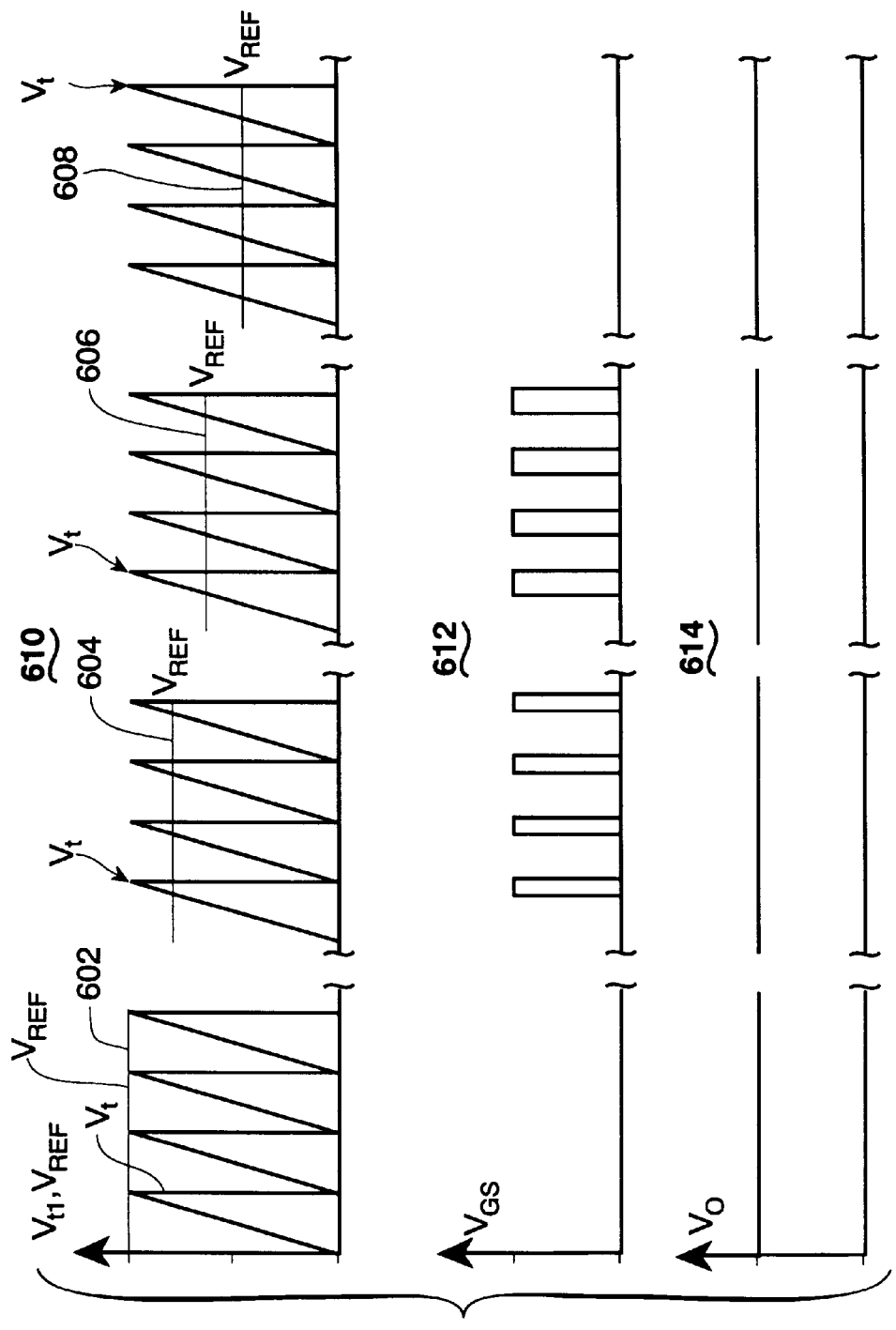
FIG. 6 shows additional aspects of the FIG. 2 circuit operation and a different perspective view of the FIG. 3 waveforms.

FIG. 6 in the drawings shows a different perspective view of the input and output waveforms for the pulse width modulation voltage comparator 204 in FIG. 2. The FIG. 6 drawing includes at 610 a segmented or interrupted four segment view of the converter inVREF sigVREF signal along with the sawtooth waveform. FIG. 6 also includes the similarly segmented or interrupted views of the operational amplifier comparator output voltage (i.e., transistor 214 turn on signal) and the overall converter output voltage at 612 and 614 respectively. Each of these signals is plotted against time along the horizontal axis and against voltage along the vertical axes in FIG.6.

In this FIG. 6 view the converter input voltage waveform at 302 in FIG. 3 therefore appears at 602, 604, 606 and 608—in a broken view form, a form which indicates the slowly falling nature expected for the converter input voltage in a practical arrangement of the invention. FIG. 6 also shows the many pulses of modulation sawtooth occurring before significantly different values of input voltage are to be expected in such a practical arrangement of the invention. The relatively large number of sawtooth waveforms at each represented voltage level in FIG. 6 also indicates the chopper transistor 214 in FIG. 2 operates at a relatively high frequency with respect to the discharge time of the super capacitor voltage in the described aircraft bus embodiment of the invention. This faster chopper rate supports the desired relatively fast regulator performance needed for effective aircraft bus transient supplementation.

In summary therefore according to the present invention a voltage divider placed in parallel to the converter input voltage provides a suitable signal feeding the input of a comparator in the disclosed arrangement of the invention. The remaining input of the comparator is supplied by a constant amplitude sawtooth waveform. With suitable inverting buffer amplifier usage either polarity input of the comparator circuit may be connected to either signal. A pulse width modulated signal is obtained at the output of the comparator. Then, such signal is used to drive a switch which controls energy storing pulse widths in the converter's inductor. In particular, the complement of the duty ratio of the switch is directly proportional to the input voltage.

The described feed-forward control is disposed to regulate the output voltage of DC-to-DC boost converters with, ideally, no need of a negative feedback control loop. The input voltage regulation of DC-to-DC buck converters can also be improved by the new feed-forward control.

The advantages of the new feed-forward control circuit follow from its structural simplicity. The control circuitry can be realized with very few readily available components at a low total cost It can be also integrated into a single circuit chip.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Direct current aircraft electrical energy distribution apparatus comprising the combination of:
   a source of direct current electrical energy located in a central portion of said aircraft;
   an electrical bus having an array of electrical bus conductors, including an electrically insulated conductor, connected with said source of direct current electrical energy, extending throughout said aircraft including less central portions of said aircraft, and connected in energizing relationship with a plurality of aircraft electrical load devices disposed throughout said aircraft;
   a plurality of electrical energy storage devices located at selected distributed locations disposed throughout said aircraft and connected locally to said array of electrical bus conductors at each said selected distributed location, said electrical energy storage devices including a super capacitor element and an energy coupling voltage boost electronic circuit communicating a transient flow of electrical energy from said super capacitor to said electrical bus conductors;
   said energy coupling electronic circuit comprising an electrical inductance element connected with said super capacitor and in series with said flow of electrical energy from said super capacitor to said electrical bus conductors, an electrical switching element connected with said electrical inductance element and generating electrical current undulations in said inductance element, and an electrical voltage regulator controller of pulse width time parameters in said electrical inductance element electrical current undulations;

said electrical voltage regulator controller including a combination pulse width modulation and regulator output voltage level reference signal waveform source and being complemented pulse width modulation time parameter-responsive to super capacitor stored-energy voltage levels appearing at an input port terminal of said electrical inductance element.

2. The direct current aircraft electrical energy distribution apparatus of claim 1 wherein said electrical voltage regulator controller is an open loop regulator circuit generating a boosted controlled output voltage from a varying input voltage.

3. The direct current aircraft electrical energy distribution apparatus of claim 1 wherein said electrical voltage regulator controller includes a periodic waveform generating electrical circuit and electrical circuitry modulating pulse width time parameters of a periodic waveform generated by said periodic waveform generating electrical circuit.

4. The direct current aircraft electrical energy distribution apparatus of claim 1 wherein said super capacitor element has an electrical size in excess of one farad.

5. The direct current aircraft electrical energy distribution apparatus of claim 1 wherein said aircraft electrical load devices include both rotating electrical machine and electronic circuit loads.

6. The direct current aircraft electrical energy distribution apparatus of claim 1 wherein said electrical voltage regulator controller further includes a series-connected second electrical switching element also connected with said output node of said electrical inductance element and a shunt-connected energy storage element connected with an output node of said second electrical switching element.

7. The direct current aircraft electrical energy distribution apparatus of claim 6 wherein said second electrical switching element comprises an electrical diode element.

8. The direct current aircraft electrical energy distribution apparatus of claim 1 wherein said source of direct current electrical energy includes one of an electrical battery, a rotating electrical machine having direct current electrical output and a chemical reaction-inclusive energy source.

9. The direct current aircraft electrical energy distribution apparatus of claim 1 wherein said electrical bus comprises a single electrically insulated conductor and an aircraft frame-inclusive common return conductor.

10. The method of energizing a combination of electrical transient-generating and transient intolerant direct current electrical loads located at electrical inductance and electrical resistance-isolated points along an aircraft energy supply bus with electrical energy of attenuated electrical transient voltage variation, said method comprising the steps of:

supplementing electrical energy supplied via said aircraft energy supply bus to said electrical inductance and electrical resistance isolated electrical loads with additional electrical energy previously removed from said bus at a slow and controlled low current removal rate and held in storage adjacent one of said electrical transient-generating load and said transient intolerant electrical loads;

storing said previously removed electrical energy in an electrical super capacitance storage element located adjacent one of said electrical transient-generating load and said electrical transient intolerant electrical loads;

operating said electrical capacitance storage element over a super capacitance change of voltage range capable of exchanging at least one half the energy stored in said electrical super capacitance storage element, a range exceeding electrical voltage transient amplitudes acceptable at said electrical transient intolerant electrical load;

coupling energy from said electrical super capacitance storage element to said energy supply bus with an electronic switching circuit-modulated electrical inductive element of controllable coupling characteristics, an element also located adjacent one of said electrical transient-generating load and said transient intolerant electrical load;

controlling said electrical capacitance storage element to aircraft energy supply bus controllable coupling characteristics according to an aircraft energy supply bus transient-attenuating open loop control algorithm, an algorithm having complemented duty cycle to output voltage characteristics and determinative of pulse width time parameters of said electrical inductive element modulation in response to electrical charge remaining in said super capacitance element;

said open loop control algorithm generating longer, inductive element energy-increasing, closure times of a shunt connected transistor switch in response to decreases in electrical charge remaining in said super capacitance element;

disconnecting said inductive element from said aircraft energy supply bus during said inductive element energy-increasing closure times of said shunt connected transistor switch in an operating cycle of said electronic switching circuit modulation.

11. The method of supplying direct current electrical energy of limited transient voltage content to electrical loads located at physically distal points along an aircraft energy supply bus, said method comprising the steps of:

supplementing electrical energy supplied via said aircraft energy supply bus to electrical transient-generating and electrical transient-sensitive electrical loads with electrical energy previously removed from said bus at a controlled removal rate and held in storage adjacent said electrical loads;

storing said previously removed electrical energy in an electrical capacitance storage element located adjacent said electrical loads;

operating said electrical capacitance storage element over a change of voltage range characteristic of removing and replacing at least one half the energy stored therein, a range exceeding electrical voltage transient amplitudes acceptable on said aircraft energy supply bus;

coupling energy from said electrical capacitance storage element to said energy supply bus of lesser voltage transient range via an electronic switching circuit-modulated electrical inductive element of variable coupling ratio, an element also located adjacent said electrical loads;

controlling said electrical capacitance storage element to aircraft energy supply bus variable coupling ratio according to an aircraft electrical energy supply bus transients-attenuating open loop control algorithm which includes a pulsating reference signal of selected constant amplitude waveform portion and complemented duty cycle to output voltage relationship included therein.

12. The method of supplying direct current electrical energy of claim 11 wherein said aircraft energy supply bus transients-attenuating open loop control algorithm is controlled in response to sampling an input voltage level received from said electrical capacitance storage element.

13. The method of supplying direct current electrical energy of claim 11 wherein said electronic switching circuit-modulated electrical inductive element of variable coupling ratio is a pulse width modulation-controlled variable coupling ratio.

14. The method of supplying direct current electrical energy of claim 13 wherein said step of coupling energy from said electrical capacitance storage element to said energy supply bus of lesser voltage transient range via an electronic switching circuit-modulated electrical inductive element of variable coupling ratio further includes the step of disconnecting said inductive element from said aircraft energy supply bus during operating cycle portions of said electronic switching circuit modulation.

15. Direct current aircraft electrical energy distribution apparatus comprising the combination of:

a source of direct current electrical energy located in said aircraft;

an electrical bus having an array of electrical bus conductors, including an electrically insulated bus conductor, connected with said source of direct current electrical energy, extending throughout said aircraft including distal portions of said aircraft, and connected in energizing relationship with a plurality-of aircraft electrical load devices disposed throughout said aircraft;

a plurality of electrical energy storage devices located at selected distributed locations disposed throughout said aircraft and connected locally to said array of electrical bus conductors at each said selected distributed location, said electrical energy storage devices including a super capacitor element and an energy coupling electronic circuit communicating a transient flow of electrical energy from said super capacitor to said electrical bus conductors;

said energy coupling electronic circuit including a voltage boosting power handling portion comprising an electrical inductance element connected between a first output terminal of said super capacitor element and an internal circuit node, a shunt disposed semiconductor switching device having switched terminals connected between said internal circuit node and a ground-connected second output terminal of said super capacitor element, a series disposed electrical diode element connected between said internal circuit node and a load connected portion of said electrically insulated bus conductor of said aircraft electrical bus;

said energy coupling electronic circuit also including a feed-forward regulator portion comprising an operational amplifier voltage comparator circuit having a voltage-sensing first input terminal connected with said super capacitor first output terminal by a resistive voltage divider network, a second input terminal connected with a source of sawtooth waveformed selectable pulse width switching signals which include a reference signal waveform portion and an output port coupled to a control terminal of said power handling portion shunt disposed semiconductor switching device and including a control algorithm having complemented duty cycle to output voltage characteristics;

said resistive voltage divider network of said feed-forward regulator portion having a voltage divider transfer function of complementing quantitative relationship with a transfer function relating super capacitor voltage and aircraft bus voltage.

16. The direct current aircraft electrical energy distribution apparatus of claim 15 wherein said energy coupling electronic circuit includes an output voltage to input voltage transfer function inclusive of a (1-D) mathematical relationship; D being an on-duty cycle fraction of said field-effect switching transistor.

17. The direct current aircraft electrical energy distribution apparatus of claim 15 wherein:

said feed-forward regulator portion operational amplifier voltage comparator first input terminal is an inverting input terminal of said operational amplifier;

said feed-forward regulator portion operational amplifier voltage comparator second input terminal is a non-inverting input terminal of said operational amplifier;

said feed-forward regulator portion operational amplifier voltage comparator output port is coupled directly to said control terminal of said power handling portion shunt disposed semiconductor switching device.

18. The direct current aircraft electrical energy distribution apparatus of claim 15 wherein:

said feed-forward regulator portion operational amplifier voltage comparator first input terminal is a non-inverting input terminal of said operational amplifier;

said feed-forward regulator portion operational amplifier voltage comparator second input terminal is an inverting input terminal of said operational amplifier;

said feed-forward regulator portion operational amplifier voltage comparator output port is coupled to said control terminal of said power handling portion shunt-disposed semiconductor switching device through a signal polarity-inverting second operational amplifier circuit.

19. Pulse width-modulated open loop direct current to direct current converter apparatus comprising the combination of:

an energy coupling voltage boosting electronic circuit communicating a flow of undulating electrical energy between a varying energy input source and a converter output load;

an electrical inductance element, within said energy coupling electronic circuit, connected intermediate said input source and said output load in communication of said undulating flow of electrical energy;

an electrical switching element connected with said electrical inductance element and generating a regulation portion of said electrical current undulations in said inductance element;

an electrical voltage regulator controller of pulse width time parameters of said electrical inductance element regulation electrical current undulations, said voltage regulator controller including a control algorithm having a complemented duty cycle to output voltage ratio characteristic;

an electronic comparator circuit connected with a signal proportional to said varying energy input source and with a selected waveform reference signal source determinative of said regulation undulations said selected waveform reference signal including waveform segments of selected waveform amplitude disposed therein.

20. The pulse width-modulated open loop direct current to direct current converter apparatus of claim 19 wherein said electrical voltage regulator controller of pulse width time parameters includes a control algorithm wherein a complement of switch ON-duty cycle (1-D) is proportional to said varying energy input source voltage level.

21. The pulse width-modulated open loop direct current to direct current converter apparatus of claim 19 wherein said selected waveform reference signal segments of selected waveform amplitude comprise waveform undulations of a sawtooth waveshape and wherein said reference signal segments further comprise peak portions of said sawtooth waveform undulations.

* * * * *